United States Patent [15] 3,691,104
Hanada [45] Sept. 12, 1972

[54] PROCESS FOR PREPARING PHOTOCONDUCTIVE POWDERS

[72] Inventor: Hiroshi Hanada, Yokohama, Japan

[73] Assignee: Canon Kabushiki Kaisha, Tokyo, Japan

[22] Filed: May 13, 1970

[21] Appl. No.: 37,040

[30] Foreign Application Priority Data

May 15, 1969 Japan ....................44/37799

[52] U.S. Cl. ....................................252/501, 96/1.5
[51] Int. Cl. ................................................H01c 7/06
[58] Field of Search ..........................23/315; 252/501

[56] References Cited

UNITED STATES PATENTS

| | | | |
|---|---|---|---|
| 3,492,620 | 1/1970 | Kaldis et al. | 252/501 |
| 3,390,090 | 6/1968 | Taylor et al. | 252/501 |
| 3,324,299 | 6/1967 | Schuil | 252/501 |
| 3,238,150 | 3/1966 | Behringer et al. | 252/501 |
| 3,133,858 | 5/1964 | Dikawa et al. | 252/501 |
| 3,037,941 | 6/1962 | Ranby et al. | 252/501 |
| 2,876,202 | 3/1959 | Busanovich et al. | 252/501 |

Primary Examiner—George F. Lesmes
Assistant Examiner—J. P. Brammer
Attorney—Joseph M. Fitzpatrick, John Thomas Cella, Charles B. Cannon, Lawrence F. Scinto, Carroll G. Harper, Charles W. Bradley, Edwin T. Grimes, William J. Brunet and Robert L. Baechtold

[57] ABSTRACT

A ternary compound of $A_4BC_6$ type where A is Cd or Zn, B is Si or Ge, and C is S, Se or Te is calcinated by using a halogen compound as flux, and if desired, in addition, an activator. The ternary compound thus calcinated has high spectral sensitivity to a shorter wave length range of visible light and is useful for electrophotographic photosensitive member.

2 Claims, No Drawings

PROCESS FOR PREPARING PHOTOCONDUCTIVE POWDERS

This invention relates to a novel process for preparing photoconductive powder having excellent spectral sensitivity at the shorter wave length range of visible light region.

It is known that a ternary compound having the general formula:

$$A_4BC_6$$

where A is Cd or Zn, B is Si or Ge and C is a chalcogen element such as S, Se and Te, for example, $Cd_4GeS_6$ and $Zn_4SiS_6$, and solid solution of the ternary compounds have excellent spectral sensitivity at the shorter wave length range of visible light region.

The above-mentioned ternary compound such as, for example, $Cd_4GeS_6$, is usually prepared by mixing appropriate amounts of CdS powder, Ge metal powder and sulfur powder, placing the resulting mixture in a vacuum vessel followed by sealing, and then calcinating the mixture.

However, the conventional methods have the following defects. The ternary compound thus obtained is not powder, but spongy lump. When the lump is ground to a finely divided powder, the photoconductive property disappears by the formation of crystal strain and crystal defect. In this case, the particles of larger than several tens microns in size may be subjected to an appropriate annealing treatment to recover the photoconductivity, but crystal strain and crystal defect of the fine powder of less than several microns are so serious that the photoconductivity can not recover by a simple annealing treatment. In addition, the alloys such as CdGe, ZnSi and the like, give rise to a high vapor pressure during the calcination and sometimes cause explosion. For the purpose of inhibiting, a small amount (e.g. several tens grams) is used in one batch and calcinated over a long time (e.g. about 60 hours). However, such procedure can not produce a large amount of product of uniform property. Furthermore, temperatures higher than 800° C. are required and a vessel capable of withstanding such high temperature is a quartz vessel, which is used as an article of consumption in such preparation of photoconductors. Therefore, the manufacturing cost is very high.

Heretofore, due to the first defect as mentioned above, such photoconductive materials have been used for photocell in a form of single crystal or sintered matter only, but not used as materials for electrophotographic photosensitive member in which finely divided powders of photoconductive material are required.

There has been recently demanded development of photoconductive powder materials having high spectral sensitivity at a shorter wave length range in the visible light region for complementing the spectrum sensitivity region of CdS etc. already used practically so as to realize multicolor reproduction.

Therefore, it is an object of this invention to provide a process for directly preparing the above-mentioned photoconductive ternary compounds and powders (particle size of about 5 to 20 microns) of solid solution thereof.

It is another object of this invention to provide a process for preparing photoconductive powders suitable for multicolor reproduction and having excellent spectral sensitivity over the whole region of visible light.

It is a further object of this invention to provide a process for preparing photoconductive powders having particularly excellent spectral sensitivity at the shorter wave length range in visible light region.

It is a still further object of this invention to provide a process for preparing photoconductive ternary compounds free from crystal strain and crystal defect in the powder particles, and powders of solid solution thereof.

It is still another object of this invention to provide a process for preparing a large amount of photoconductive ternary compounds within a short time at low cost.

Other objects and advantages will be apparent from the following description and the appended claims.

According to the present invention, an $A_4BC_6$ type ternary compound, where A is a member selected from the group consisting of Cd and Zn, B is a member selected from the group consisting of Si and Ge, and C is a member selected from chalcogen elements, that is, sulfur, selenium and tellurium, produced preliminarily by thermal synthesis, is ground to finely divided powders, and the resulting finely divided powders are mixed with a halogen compound as flux, and if desired, an activator such as copper salts, silver salts and the like, for example, $CuCl_2$, $Cu(NO_3)_2$, cupric acetate, and silver nitrate, and calcinated to form a photoconductive ternary compound in a form of fragile lump.

Further, according to another aspect of this invention, at least one compound selected from chalcogen compounds of Cd or Zn and at least one compound selected from Ge, Si (as simple substance), and chalcogen compounds of Ge or Si are mixed at a ratio suitable for forming $A_4BC_6$ type ternary compounds such as, for example, $Cd_4GeS_6$ and $Zn_4GeSe_6$, and a halogen compound is added thereto as flux, and if desired, additionally an activator such as copper salts, silver salts is added, and further an appropriate amount of pure water is added and mixed therewith. The resulting mixture was dried and ground to coarse powders. The coarse powders thus obtained are calcinated at a temperature higher than the melting point of the mixture (in general, higher than about 600° C) at atmospheric pressure to produce the above-mentioned photoconductive ternary compound in a form of fragile lump. The calcination is preferably carried out in an inert atmosphere.

According to a further aspect of this invention, at least one compound selected from $A_4BC_6$ type ternary compounds, where A, B and C are as defined above, preliminarily produced by thermal synthesis, and at least one compound selected from chalcogen compounds of Cd or Zn, and/or at least one member selected from Ge single substance, Si single substance and chalcogen compounds thereof, are mixed and a halogen compound is added thereto as flux, and further, if desired, an activator such as copper salts and silver salts is added thereto. The resulting mixture is mixed with an appropriate amount of pure water, dried and coarse powders thereof are obtained. Then, Then the coarse powders are calcinated at a temperature higher than melting point of the mixture under atmospheric pressure to produce the photoconductive ternary compound in a form of fragile lump.

The lump thus obtained can be directly ground to photoconductive powders. Further, the lump may be put in a deionized water to cause spontaneous fragmentation forming photoconductive powders of about 10 $\mu$ in size and the water soluble matter in the powder matter can be simultaneously removed.

When the ternary compounds thus obtained and solid solution powders thereof are calcinated together with a chalcogen element such as, for example, sulfur in an inert atmosphere such as, for example, nitrogen atmosphere, dark resistance of the photoconductive powder is raised to become particularly suitable for electrophotography.

Representative examples of $A_4BC_6$ type ternary compounds used in this invention are: $Cd_4GeS_6$, $Cd_4GeSe_6$, $Cd_4GeTe_6$, $Cd_4SiS_6$, $Cd_4SiSe_6$, $Cd_4SiTe_6$, $Zn_4GeS_6$, $Zn_4GeSe_6$, $Zn_4GeTe_6$, $Zn_4SiS_6$, $Zn_4SiSe_6$, $Zn_4SiTe_6$ and solid solutions thereof.

Representative examples of chalcogen compounds of Cd or Zn are: CdS, CdSe, CdTe, ZnS, ZnSe, ZnTe and solid solutions thereof.

Representative examples of chalcogen compounds of Ge or Si are: $GeS_2$, $GeSe_2$, $GeTe_2$, $SiS_2$, $SiSe_2$, $SiTe_2$ and solid solutions thereof.

Among halogen compounds used as flux in this invention, there are included ammonium chloride and halides of monovalent or divalent metals such as $CdCl_2$, $ZnCl_2$, $CaCl_2$, $SrCl_2$, $BaCl_2$, NaCl and the like.

The flux is used in an amount of about 5 to 20 percent by weight, preferably about 10 percent by weight based on the total amount of the mixture (including flux) to be calcinated.

Optimum calcinating temperature varies, to some extent, depending upon the kind of flux. For example, optimum calcinating temperature of $CdCl_2$ is about 580°–700° C, that of $ZnCl_2$ about 500°–650° C, and that of $CaCl_2$ about 750°–850° C.

According to a process of this invention, photoconductive powder matter of about 10 $\mu$ in size can be directly obtained without grinding and be used as an electrophotographic material as $\mu$ by is. Further, the particle size can be controlled within a range of 5 to 20 by appropriately selecting the halogen compound flux and the amount of flux.

The process of this invention can be carried out at atmospheric pressure, i.e. at open state, and therefore, there is no fear of explosion and thereby it is not necessary to calcinate each small portion over long period of time and a large amount (for example, more than several kg.) of the materials can be calcinated in one batch within a short time (for example, about 30 minutes) to produce the desired ternary compound. The calcinating temperature is generally about 600° C and, therefore, it is not necessary to use a quartz vessel, but a usual heat resistance glass may be sufficiently used, and since the calcination can be carried out at an open state, the vessel can be repeatedly used so that the manufacturing cost is low.

According to the process of this invention, photoconductive powder matters having high spectral sensitivity to visible light of shorter wave length, i.e. blue light of wave length ranging from 400 m$\mu$ to 500 m$\mu$ can be obtained in a large amount at low cost. Therefore, for example, the photoconductive powder thus obtained can be used for complementing photosensitive region of conventional electrophotographic photosensitive member such as CdS to realize multicolor reproduction.

The following examples are given for illustration of the present invention, but not for restriction thereof.

EXAMPLE 1

Hydrogen sulfide gas was passed through a strong aqueous hydrochloric acid solution in which $GeO_2$ powder was dissolved and thereby white $GeS_2$ was precipitated. The resulting precipitate was sufficiently washed by decantation, filtered and dried. The $GeS_2$ thus obtained (1,366 parts by weight) and CdS powder (5,776 parts by weight) were mixed with a flux comprising 714 parts by weight of $CdCl_2$ powder and 71 parts by weight of $NH_4Cl$ powder, and further, 2 parts by weight of $CuCl_2$ as an activator and 2,500 parts by weight of deionized water were added thereto and the resulting mixture was sufficiently kneaded and then dried.

The resulting dried lump was ground to particles of an appropriate size, placed in a quartz test tube, and calcinated in a nitrogen atmosphere at about 600° C for 30 minutes. The resulting calcinated matter was put into a deionized water and thus the calcinated matter was spontaneously broken to finely divided powders (about 10 $\mu$ of particle size). The finely divided powders thus obtained were repeatedly washed by decantation and dried. The resulting dry powders were placed in a quartz test tube together with 14 parts by weight of sulfur powder, calcinated in a nitrogen atmosphere at about 500° C. for 15 minutes and then excess sulfur vapor was evacuated by a rotary pump. The resulting powders were then cooled. Thus, photoconductive powders suitable for electrophotography.

As the result of X-ray diffraction, the resulting powders were found to be of monoclinic system, and the formation of $Cd_4GeS_6$ was confirmed.

Spectral sensitivity of a layer formed by binding the resulting $Cd_4GeS_6$ powder with a small amount of epoxy resin was determined and found to be highly sensitive to light of wave length ranging from 400 m$\mu$ to 500 m$\mu$.

ZnS powders may be used in place of CdS powders in the above mentioned procedure. Further, in the above mentioned procedure, CdS powder may be directly added to the strongly acidic aqueous solution of $GeO_2$ and treated with hydrogen sulfide gas to coprecipitate a mixture of CdS and $GeS_2$, and then, a flux is added thereto.

EXAMPLE 2

5,780 parts by weight of CdS, 726 parts by weight of Ge, and 641 parts by weight of sulfur were placed in a quartz tube and air was evacuated to form vacuum and the tube was sealed. The materials were heated for about 40 hours by raising the temperature at a rate of 20° C per hour. After keeping the materials at a temperature higher than 800° C for several hours, the materials was cooled to room temperature to obtain $Cd_4GeS_6$.

In order to take out the completely synthesized portions, ultraviolet ray was projected to the lump obtained above by a black light and only the portions emitting visible fluorescence were taken out and ground to finely divided powders by a mortar.

When the powders thus obtained were bound with an appropriate binder, they did not show excellent photoconductivity.

Then, 100 parts by weight of $Cd_4GeS_6$ thus obtained, 10 parts by weight of $CdCl_2$, one part by weight of $NH_4Cl$ and 150 parts by weight of pure water were sufficiently mixed, dried, calcinated in a nitrogen atmosphere at 650° C for 30 minutes, put in pure water, and washed to obtain powders of about 10 $\mu$ in particle size. The powders thus obtained were further calcinated in sulfur vapor for 20 minutes to produce photoconductive powders. The resulting photoconductive powders bound with about 15 percent by weight of an epoxy resin are highly sensitive to a light of wave length ranging from 400 m$\mu$ to 500 m$\mu$.

EXAMPLE 3

In a manner similar to that described in Example 2, but using 30 parts by weight of $Cd_4GeS_6$ and 70 parts by weight of CdS in place of 100 parts by weight of $Cd_4GeS_6$, and 10 parts by weight of $ZnCl_2$ in place of $CdCl_2$, and further adding 0.03 part by weight of $CuCl_2$, and calcinating at 600° C, there were obtained photoconductive powders. The resulting photoconductive powders were bound with about 15 percent by weight of an epoxy resin and the resulting matter thus bound gave a panchromatic electrophotographic photosensitive layer highly sensitive to visible light of wave length ranging from 400 m$\mu$ to 700 m$\mu$.

EXAMPLE 4

By substituting 80 parts by weight of $Cd_4GeS_6$ and 20 parts by weight of $GeS_2$ for 100 parts by weight of $Cd_4GeS_6$, substituting $CaCl_2$ for $CdCl_2$ recided in Example 2, and calcinating at 800° C and following the procedure described in Example 2, there were obtained photoconductive powders. The resulting photoconductive powders were also highly sensitive to visible light of shorter wave length region.

EXAMPLE 5

By substituting 30 parts by weight of $Cd_4GeS_6$, 60 parts by weight of CdS, and 10 parts by weight of $GeS_2$ for 100 parts by weight of $Cd_4GeS_6$ recited in Example 2, and adding 0.03 part by weight of $CuCl_2$ and following the procedure in Example 2, there were obtained photoconductive powders.

The photoconductive powders thus obtained gave a panchromatic electrophotographic photosensitive material as in Example 3.

What is claimed is:

1. A process for preparing photoconductive powders for electrophotography which comprises calcinating at a temperature of from 600°–800° C a ternary compound of the formula $$A_4BC_6$$

wherein A is a member selected from the group consisting of Cd and Zn, B is a member selected from the group consisting of Si and Ge, and C is a member selected from the group consisting of S, Se and Te, with a flux selected from the group consisting of $CdCl_2$, $NH_4Cl$, $ZnCl_2$, $CaCl_2$, $SrCl_2$ and NaCl, wherein said flux is utilized in an amount of from 5 – 20 percent by weight based on the total amount of the material to be calcinated, and placing the product thus calcinated in water to cause a spontaneous fragmentation resulting in the formation of a finely divided powder containing particles of about 5 – 20 microns in size.

2. A process for preparing photoconductive powders selected for electrophotography which comprises mixing a member selected from the group consisting of CdS, CdSe, CdTe, ZnS, ZnSe, and ZnTe and a member selected from the group consisting of Ge, Si, $GeS_2$, $GeSe_2$, $GeTe_2$, $SiS_2$, $SiSe_2$, and $SiTe_2$ in a mixing ratio such that a compound of the formula $$A_4BC_6$$

wherein A is selected from the group consisting of Cd and Zn, B is selected from the group consisting of Si and Ge and C is selected from the group consisting of S, Se and Te, is formed, calcinating at a temperature of from 600° – 800° C the resulting mixture with a flux selected from the group consisting of $CdCl_2$, $NH_4Cl$, $ZnCl_2$, $CaCl_2$, $SrCl_2$, and NaCl, wherein said flux is utilized in an amount of from 5 – 20 percent by weight based on the total amount of the material to be calcinated; and placing the product thus calcinated in water to cause a spontaneous fragmentation resulting in the formation of a finely divided powder containing particles of about 5 – 20 microns in size.

* * * * *